US005128691A

United States Patent [19]

Millet et al.

[11] Patent Number: 5,128,691

[45] Date of Patent: Jul. 7, 1992

[54] METHOD OF CHECKING THE PRINTING QUALITY OF AN INK JET PRINTER

[75] Inventors: Jean-Claude Millet, Bourg-lès-Valence; Luc Regnault, Montelegger, both of France

[73] Assignee: Imaje SA, Bourg-lès-Valence, France

[21] Appl. No.: 397,449

[22] PCT Filed: Oct. 25, 1988

[86] PCT No.: PCT/FR88/00523

§ 371 Date: Aug. 21, 1989

§ 102(e) Date: Aug. 21, 1989

[87] PCT Pub. No.: WO89/04764

PCT Pub. Date: Jun. 1, 1989

[30] Foreign Application Priority Data

Nov. 24, 1987 [FR] France .............................. 87 16446

[51] Int. Cl.[5] .............................. G01D 18/00

[52] U.S. Cl. .............................. 346/1.1; 346/75; 346/140 R

[58] Field of Search .............................. 346/1.1, 75, 140 R

[56] References Cited

U.S. PATENT DOCUMENTS

| | | | |
|---|---|---|---|
| 3,992,713 | 11/1976 | Carmichael et al. | 346/75 |
| 4,675,696 | 6/1987 | Suzuki | 346/140 R X |
| 4,800,396 | 1/1989 | Hertz | 346/1.1 |

FOREIGN PATENT DOCUMENTS

| | | |
|---|---|---|
| 36787 | 9/1981 | European Pat. Off. . |
| 2434786 | 2/1975 | Fed. Rep. of Germany . |
| WO82/01415 | 4/1982 | PCT Int'l Appl. . |

*Primary Examiner*—Benjamin R. Fuller
*Assistant Examiner*—Gerald E. Preston
*Attorney, Agent, or Firm*—Oblon, Spivak, McClelland, Maier & Neustadt

[57] ABSTRACT

The invention provides a method for checking the printing quality of an ink jet printer. A control frame is printed independently of a marking message. This frame is, for example, formed of 15 dots of which the charge increases from the first to the fifteenth droplet. The distance ($G_1$, $G_2$, $G_3$) separating, respectively, the droplets (1) and (8), the droplets (8) and (15) and the droplets (1) and (15) are permanently maintained so as to correspond to the two relationships: $G_1G_3=k_1$ and $G_2/G_2=k_2$, where $k_1$ and $k_2$ are constants.

8 Claims, 1 Drawing Sheet

METHOD OF CHECKING THE PRINTING QUALITY OF AN INK JET PRINTER

BACKGROUND OF THE INVENTION

1. Field of the Invention

The invention relates to a method of checking the printing of an ink jet printer.

2. Description of the Prior Art

The applications of this type of printer, in the industrial marking field in particular, increase regularly. Purely by way of illustration, there may in particular be mentioned the printing of "use by" dates on agro-alimentary products or batch numbers. Such marking is carried out more and more using ink jet printers of the "continuous deflected ink jet" type. The correct operation of such printers is governed by a number of relatively complex parameters which must be perfectly controlled if it is desired to obtain irreproachable printing quality. Despite the numerous improvements introduced these latter years in such printers, they are not proof against drifting of one or other of the parameters governing their operation, which may result in degradation of the quality of the writing. It is further known that, in most cases, such degradation of the writing quality has a typology in relation with the defective parameter. For example, the absence of an impact of droplets on the support to be printed may mean that the printing head needs cleaning. Similarly, to a fault in the positioning of the droplets there may correspond an abnormal ejection speed of the droplets or an incorrect speed of the movement of the head. Another problem may arise in so far as the size of the droplets is concerned. Furthermore, manufacturing or packing lines are more and more automated and permanency of the quality appears as of prime importance. Finally, since the marking function comes at the end of the production line, any defective marking results in unacceptable losses.

SUMMARY OF THE INVENTION

The object of the present invention is to overcome these problems by describing a method and device for anticipating the imminence of a break-down of quality;

- by identifying the break-down of quality in the shortest possible time after its appearance;
- stopping the manufacturing line or replacing the marking machine before it is too late.

The invention relates more precisely to a method of checking the printing quality of a jet printing head characterized in that it consists:

- in creating a frame for checking at different times and positions of the marking;
- in reading this control frame so as to compare it with a reference frame.

BRIEF DESCRIPTION OF THE DRAWINGS

The invention will be better understood from the following explanations and the three accompanying figures which schematically illustrate three variants of construction of a device for implementing the method of the invention, wherein.

DETAILED DESCRIPTION OF THE PREFERRED EMBODIMENTS

One of the features of the method of the invention resides in the fact that it consists on the one hand in creating a specific control frame, at given times and/or positions and in reading same so as to compare it with a control frame of the same type serving as reference.

The control frame may be independent, i.e. independent of the text to be printed or connected to the printer or other control members of the line. The pattern to be checked is defined and specified to the control system in real time.

According to another feature of the invention, the control frame is formed of a series of dots which can be printed either systematically, or regularly at a fixed frequency, or regularly at a frequency resulting from an apprenticeship procedure related to the specific conditions of use. This control frame is therefore printed in addition to the useful message, in general before the latter but not limitatively.

According to another feature of the invention, the control frame is defined as a frame formed of a succession of remarkable dots. These dots are positioned so that checking thereof makes it possible to guarantee that the printing is correct with sufficient probability. For a given frame and under normal operating conditions, the position of the different impacts is perfectly well known and unique within a given tolerance. If the operating conditions of the head worsen (particularly at the printing, ink, droplets charge voltage, deflection voltage levels), this causes a modification of the positioning of the different impacts outside fixed tolerances. This is detected by a control means which reveals incorrect operation of the printing machine.

Figure 1:
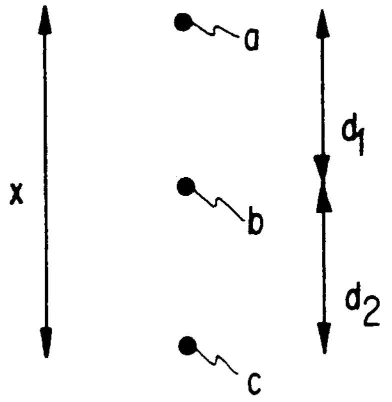
FIG. 1 is a control frame of a matrix comprising a column of three dots.
Figure 2:
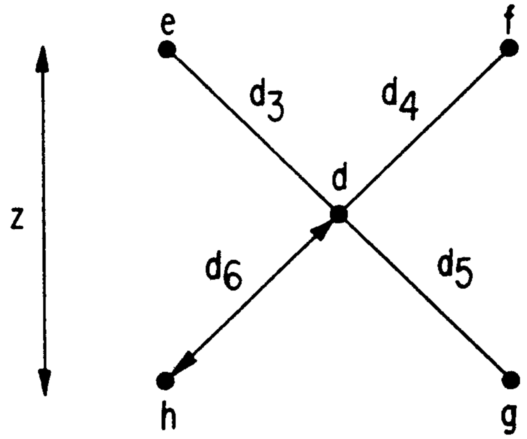
FIG. 2 is a control frame formed of a matrix of five dots.

In a variant of the method of the invention, a control frame is formed, as shown in FIG. 1, of a matrix comprising respectively a column of three dots (a,b,c) and, as shown in FIG. 2, five dots (d,e,f,g,h).

In the first case (FIG. 1), variations of the distance (x) separating two end dots and variations in the two distances ($d_1$) and ($d_2$), separating dot (b) from dot (a) and dot (b) from dot (c) are measured.

In the second case, the variations of the height (z) of the matrix of five dots and the variations of the distances ($d_3$, $d_4$, $d_5$, $d_6$) between, respectively, the central dot (d) and dots (e,f,g,h) are measured. Any drift of (z) as well as of ratios ($d_3/d_6$) and ($d_4/d_5$) is significant of an operating fault.

In a second variant of the method of the invention, the control frame is formed of at least three printed droplets whose recognition makes it possible to guarantee, with a sufficiently high rate of probability, good printing quality. The distribution of the dots is as follows:

- a droplet charged at the minimum voltage;
- at least one droplet charged at an intermediate voltage;
- a droplet charged at the maximum voltage.

The voltage of the droplets is sufficient to make a significant measurement possible.

Figure 3:
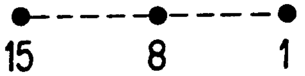
FIG. 3 is a control frame of fifteen dots.

FIG. 3 is an illustration of such a control frame comprising fifteen dots, going then from 1 to 15, droplets (1) being the least deflected and droplets (15) the most deflected.

Such printing of the control frame, as was mentioned above, is, for example, periodic before each message. A conventional recognition device formed, for example, from a lighting source, a sensor (CCD) with its optical system and associated processing electronics is provided for reading this control frame. The sensor (CCD) is focussed on the printed support at the position of impact of the droplets. This arrangement makes it possible to read the control frame whether the support is moving or stopped. In the first case, a synchronization signal causes the image of the control frame to be picked up at the moment when it arrives on the support.

The results can be used for checking that printing of the control frame is correct or not under the operating conditions of the machine.

In normal use, the operator may adjust the deflection voltage of the droplets and cause the printing distance to vary, which results in both cases in expansion of the frame heightwards. However, the relative position of the different droplets is substantially maintained if a certain charging order is respected: for example, if the droplets are sent in increasing charging order. By applying this property to the control frame illustrated in FIG. 3, the following results are obtained:

$G_1$=distance between impact of droplets 1 and 8;

$G_2$=distance between impact of droplets 8 and 15;

$G_3$=distance between impact of droplets 1 and 15.

Under normal operating conditions (speed of the jet and charging correct), independently of the value of the deflection voltage (specific range) and of the specified printing distance, the following relationships can be written, provided that they remain within a specified range:

$$G_1/G_3=k_1 \text{ and } G_2/G_3=k_2.$$

($k_1$) and ($k_2$) are known constants whose values are the image of a correct deflection, so correct printing.

If we add to said control frame a second control frame, the control means may measure the distance between the control frames, so the printing speed which depends on the speed of the conveyor if the head is fixed or the speed of the head if the conveyor is fixed. It may thus detect in addition to printing defects, an anomaly in the travelling speed.

The invention applies, as was said above, to any industrial marking installation using the ink jet technique.

We claim:

1. A method for checking print quality of an ink jet printer which comprises the steps of:

creating a controlled frame for checking a marking operation at different times and positions wherein said control frame is formed of a plurality of dots printed at a frequency related to operating conditions of said printer wherein said creating step comprises forming said control frame comprising a matrix of three dots including a middle dot, a first end dot and a second end dot; and reading said control frame so as to compare said control frame with a reference frame wherein said reading comprises measuring each distance separating said first end dot and said end dot, said middle dot and said first end dot, and said middle dot and said second end dot, respectively.

2. A method for checking print quality of an ink jet printer which comprises the steps of:

creating a control frame for checking a marking operation at different times and positions wherein said control frame is formed of a plurality of dots printed at frequency related to operating conditions of said printer, wherein said creating step comprises forming said control frame comprising a matrix of five dots including a central dot and four surroundings dots; and reading said control frame so as to compare said control frame with a reference frame, wherein said reading step comprises measuring a height of the matrix and each distance separating said central dot and each of said surrounding dots, respectively, so as to detect any variation of the height of said matrix, and any variation in ratios of said respective distances separating said central dot and each of said four surrounding dots.

3. A method for checking print quality of an ink jet printer which comprises the steps of:

creating a control frame for checking a marking operation at different times and positions wherein said control frame is formed of a plurality of dots printed at a frequency related to operating conditions of said printer, wherein said creating step comprises forming said control frame comprising at least three droplets and wherein said at least three droplets are charged at minimum voltage, at an intermediate voltage and at a maximum voltage, respectively; and reading said control frame so as to compare said control frame with a reference frame.

4. A method for checking print quality as defined by claim 3, wherein said control frame comprises fifteen dots of increasing charge, and each distance between an impact of a first droplet and an impact of an eighth droplet, between said impact of said eighth droplet and an impact of a fifteenth droplet, and between said impact of said first droplet and said impact of said fifteenth droplet, respectively, is maintained such that a first ratio of said distance between said impact of said first droplet and said impact of said eighth droplet to said distance between said impact of said first droplet and said impact of said fifteenth droplet is constant, and a second ratio of said distance between said impact of said eighth droplet and said impact of said fifteenth droplet to said distance between said impact of said first droplet and said impact of said fifteenth droplet is also constant.

5. A method for checking print quality of an ink jet printer which comprises the steps of:

creating a control frame for checking a marking operation at different times and positions, wherein said control frame comprises a series of three dots;

reading said control frame to measure distances separating each of a first dot and a third dot, said first dot and a second dot, and said second dot and a third dot, respectively; and comparing said control frame with a reference frame to detect variations in said measured distances.

6. A method for checking print quality of an ink jet printer which comprises the steps of:

creating a control frame for checking a marking operation at different times and positions, wherein said control frame comprises a matrix of five dots, including a central dot and four surrounding dots;

reading said control frame to measure a height of said matrix and each distance separating said central dot and each of said four surrounding dots, respectively; and comparing said control frame with a reference frame to detect a variation in said height of said matrix as well as variation in ratios of said respective distances between said central dot and each of said four surrounding dots.

7. A method for checking print quality of an ink jet printer which comprises the steps of:

creating a control frame for checking a marking operation at different times and positions, wherein said control frame comprises at least three printed droplets, and said at least three printed droplets are charged at a minimum voltage, an intermediate voltage, and a maximum voltage, respectively;

reading said control frame; and comparing said control frame to a reference frame.

8. A method for checking print quality as defined by claim 7, wherein said creating step comprises printing fifteen dots of increasing charge such that each distance between an impact of a first droplet and an impact of an eighth droplet, between said impact of said eighth droplet and an impact of a fifteenth droplet, and between said impact of said first droplet and said impact of said fifteenth droplet, respectively, is maintained such that a first ratio of said distance between said impact of said first droplet and said impact of said eighth droplet to said distance between said impact of said first droplet and said impact of said fifteenth droplet is constant, and a second ratio of said distance between said impact of said eighth droplet and said impact of said fifteenth droplet to said distance between said impact of said first droplet and said impact of said fifteenth droplet, is also constant.

* * * * *